Dec. 1, 1964    H. BEHRINGER    3,159,695
PROCESS FOR PNEUMATIC FORMATION OF THERMOPLASTIC FOILS
Filed Oct. 17, 1960    4 Sheets-Sheet 1

Inventor:
Hans Behringer
Brennan + Brennan

Hans Behringer
*Inventor.*

Dec. 1, 1964 H. BEHRINGER 3,159,695
PROCESS FOR PNEUMATIC FORMATION OF THERMOPLASTIC FOILS
Filed Oct. 17, 1960 4 Sheets-Sheet 3

Hans Behringer
*Inventor:*
Bierman + Bierman

Hans Behringer
Inventor:

United States Patent Office

3,159,695
Patented Dec. 1, 1964

3,159,695
PROCESS FOR PNEUMATIC FORMATION OF THERMOPLASTIC FOILS
Hans Behringer, Munich, Germany, assignor to Werner Bahlsen, Hannover, Germany
Filed Oct. 17, 1960, Ser. No. 63,207
9 Claims. (Cl. 264—93)

This invention relates to methods and apparatus for shaping thermoplastic foils.

In known methods of this kind an arcuate sheet-like foil clamped in a frame is heated to the temperature required for shaping and is then subjected to compressed air on one side so that it expands and its surface is enlarged until it engages with appropriately disposed positive or negative moulds, whereafter the foil is allowed to cool, setting as it does so, whereafter the finished article can be removed from the mould. In the known method the foil is heated to the temperature required for shaping by means of a hot-air furnace or radiant electric heating elements. It is difficult to heat the foil to the exact temperature required for shaping, remembering that differences of as little as 2 or 3° C. very often lead to increased waste, while greater variations may cause chemical changes or even decomposition in the foil material. A factor greatly complicating heating to the correct temperature is that the commercially available foils vary in thickness and therefore in their heat capacity. Also, commercially available foils reflect infra-red rays differently from their surface, and the variations in reflectivity cannot be detected unless measuring equipment is used. Where heating by means of warm air or infra-red radiation is used, heat losses are considerable so that the process becomes rather expensive. Endeavours have also been made to heat foils by direct contact with a heated surface, for instance, by laying a foil on a heating plate but it is very difficult to provide the required intimate contact between such a surface and the foil, since the foil becomes curved and warped as soon as it comes near a hot surface, and where it actually makes a direct contact with the hot surface it remains sticking thereto and can usually be removed only by being completely destroyed. Elsewhere no direct contact occurs, since bubbles of air and the like are included between the foil and the heating surface. Consequently the foil can neither be evenly heated nor removed from the heated surface without being destroyed, so that direct contact heating has not previously been used in the pneumatic shaping of foils. Endeavours have been made to obviate these disadvantages, for instance, by providing a separating medium or covering on a heated plate, but were unsatisfactory since coverings of this kind are destroyed very rapidly and therefore become useless.

It has surprisingly been found that all the advantages of contact heating can be provided if the foil is first brought into complete engagement with the heated surface and then disengaged pneumatically therefrom. According to the invention, therefore, the foil to be shaped or that portion of such foil which it is required to shape is brought into bearing engagement with a heated surface, such as a heated plate, and thus heated to the temperature required for shaping, then disengaged from the surface pneumatically and, through the agency of a mould which may or may not be cooled, shaped into the finished article. When the foil enters into bearing engagement with the heated surface, it rapidly heats up to the temperature thereof. Overheating is therefore impossible. By controlling the temperature of the heated surface or, and as will be described hereinafter in greater detail, by controlling the heat transfer between such surface and the foil, the temperature thereof can be adapted accurately to the required temperature for shaping. Heat transfer is substantially loss-free so that the method is cheaper than the known methods and processes. In contrast to the known methods, small foils or foil portions can be heated by small heating surfaces, so that only reduced amounts of heat are required. The foil or that part thereof which it is required to shape can be pressed on to the heated plate by mechanical means so as to bear flush thereagainst, no air bubbles being left between the foil and the heating plate. The mechanical pressing can be performed in any desired manner, for instance, by means of rollers guided over the heating plate. Advantageously, however, the foil or that part thereof which it is required to shape can be pressed or sucked on to the heating plate pneumatically, provided, of course, that appropriate compressed air or suction pipes are provided which will be described in detail hereinafter. This pneumatic operation required less time than mechanical pressing, since pneumatic pressing can be performed instantaneously.

According to another feature of the method according to the invention, the foil or that part thereof which it is required to shape is clamped between opposite peripheral edges of a hollow mould and of a heating plate. The foil thus clamped can be treated as required with compressed air and with negative pressure, since the chamber in which the foil is disposed is sealable and the air entries and exits of such chamber can be controlled as required. Advantageously, the shaping of the article is completed subsequently to the disengagement of the foil from the heating plate pneumatically by compressed air or by negative pressure. In a preferred form of the method according to the invention, the foil or that part thereof which it is required to shape is first given negative pressure treatment, to ensure that the foil engages flush with the heating plate, and is then given compressed air treatment to raise and to finish-shape the article, or vice-versa. For instance, if the heating plate is formed with an aperture connected to a source of negative pressure and compressed air, the foil can first be given negative pressure treatment to engage it flush with the heating plate, so that it is brought to the temperature required for shaping very rapidly, whereafter compressed air can be supplied through the aperture in the heating plate, with the result that the foil clamped between the edges of the heating plate and the mould is first raised gently away from the hot surface of the heating plate and then pressed into the mould in which it can cool and set. Of course, air vents must be provided in this case. Conversely, apertures in the mould can be connected to the source of compressed air or negative pressure, in which case the heating plate must be formed with air vent apertures. Compressed air is first supplied to the mould, so that the foil is pressed on the heating plate. Any air remaining between the heating plate and the foil can escape through the vent apertures on the heating plate. The foil is then sucked into the mould by negative pressure. The kind of apparatus used to carry the method into effect will mainly determine which arrangement is preferable. As a rule, it will be preferable to suck the foil on to the heating plate since it is then easier to move the mould about. As a rule, the procedure will be such that the foil or that part thereof which it is required to shape is removed from the hollow mould after the required cooling, whereafter the hollow mould is recharged with a new foil or with a new foil portion. Only one heating plate and one hollow mould are then required to produce the articles.

In many cases, however, it may be advantageous so to carry the method into effect that the finish-shaped articles remain after shaping in the hollow moulds which are supplied at the same cadence as the foil parts which it is required to shape, and are conveyed onwards in the moulds. This has the particular advantage that any further shaping step can be performed while the previously shaped article is still cooling in the mould. The method can therefore be performed very rapidly. Advantageously, parts of a foil strip are shaped and the finish-shaped articles remain in the foil strip until further use. This has the advantage that the supply to the shaping tool is facilitated, since a strip of foil is, of course, easier to control for feeding purposes than individual pieces or portions of foil, and the finish-shaped articles remain in the foil strip in which they can more easily be introduced into some further tool such as a cover device, than can articles which have previously been removed from the strip of foil.

The method according to the invention is advantageous not only, for instance, in the production of recipient underparts, covers or other separate plastic components but also in cases where it is required to introduce a plastic foil into an aperture in an article. The corresponding article then acts substantially as the hollow mould, and the invention is accordingly further distinguished in that as hollow mould or as a part of hollow mould there are used articles or parts thereof which it is required to close or seal. In this way, for instance, milk recipients can be provided with bases or closures for lubricating nipples can be produced.

In such a case, the articles which it is required to close or seal and/or the foil parts are provided, at least in the areas where they engage with one another when the foil part has been finish-shaped, with an adhesive which is made sticky more particularly by the increased temperature of the foil during shaping and which, after cooling, rigidly secures the finish-shaped foil to the article which it is required to close or seal, so that the required effect—i.e., closure or sealing—is fully achieved. There can be used for this purpose more particularly foils comprising a thermoplastic heat-sealable layer.

It has been found that the method according to the invention can be used to produce complicated articles which can serve, for instance, as bases or covers for recipients, more particularly packaging recipients; according to the invention, some of the thermoplastic foil is moulded, near the means for retaining the foil, on to that side of a mould part which is remote from the centre of the mould, and the article is separated from the foil strip at the bottom end of the foil part thus moulded. In this method the foil bears tightly against the mould parts against which it is pressed. If the mould part is designed as the bottom part of a recipient, a falling cover exactly adapted to the bottom part of the recipient can be provided in a simple manner once the article has been separated out of the strip of foil. If the mould part is shaped as the edge of a recipient, an insertable cover with an overlapping edge can be provided which fits the recipient much better than the overlapping edge type insertable covers produced by the prior art methods. Of course, the pressed-in part of the cover corresponds to the articles hereinbefore described, except that the overlapping edge is provided in addition. It is expressly stated that the covers need not be separated out of the strip of foil immediately after the covers have been finished-shaped and that, as already described, the covers or other articles can initially remain in the strip of foil so as to form a cover strip or the like which can initially be further processed in any desired way.

Very advantageously, an article or part thereof which it is required to close or seal can be used as a mould element. The article to be closed or sealed can be a packaging recipient or the top or bottom edge thereof, but any other kinds of article can be used. According to one advantageous embodiment of the method, a portion of the thermoplastic foil is finish-shaped to form a groove surrounding the mould part peripherally, such groove being pressed against the mould part by that of its sides which is near the centre of the mould. The groove which is formed in this way and which, if the foil is considered from the other side, can be considered as a bead, is then separated from the strip of foil near its bottom apex.

Alternatively, the foil part to be pressed against the mould is, after finish-shaping of the cold foil or simultaneously with such finish-shaping, drawn over the mould part and pressed thereagainst. This step also ensures a sealing-tight engagement between the corresponding foil part and the mould part, with the advantage that only a minimum of foil material is required.

Clearly, the thermoplastic foil always bears very tightly against the recipient edge or the like so that a sealing tightness sufficient for normal purposes is provided just by the shaping of the foil. In this form of the method according to the invention, however, the articles which it is required to close or seal and/or the foil parts are provided, at least in the areas where they engage with one another when the foil part has been finish-shaped, with an adhesive which is made sticky, more particularly by the increased temperature of the foil during shaping, and which, after cooling rigidly secures the finish-shaped foil to the article which it is required to close or seal. This applies more particularly to the case where a packing recipient is to be provided with a base or cover. That part of the recipient which it is required to close is usually provided on the inside or outside in any case with a covering of a thermoplastic to which the initially hot foil is joined in sealing-tight manner. The edge of the recipient to be closed can readily be provided with an adhesive which, when a press-in cover having an overlapping edge is being formed, extends into the groove fitting the recipient edge and provides a sealing-tight closure of such groove. According to the invention, this groove engaging over the recipient edge or the like can be made substantially bead-like by an appropriate choice of pressure and temperature, since the foil adapts itself intimately to the recipient edge or to the corresponding moulding element only upon the completion of finish-shaping. By the use of a reduced temperature and reduced pressure or by interrupting the finish-shaping operation, the said groove can be caused to remain with a substantially bead-like bottom part and does not bear intimately against the edge of the moulding element, so that the base of the groove can be provided with a sealing compound which subsequently encloses the recipient edge and thus provides a reliable seal of the base or cover. Advantageously, in an apparatus for carrying the method according to the invention into effect the heating plate surface is formed with a network or raster of fine grooves or ducts through which any inclusions of air can escape when the foil is pressed against the heating plate. Such grooves or ducts can provide a lateral escape for the air. Advantageously, they are connected to the supply pipes for compressed air or negative pressure, so that not only can air escape through such grooves or ducts but also the negative pressure or compressed air used can act upon the foil by way of the grooves or ducts.

Preferably, the grooves or ducts in the heating-plate surface are widened and/or placed closer together in zones where this intense heating of the foil is required for reasons connected with shaping. Clearly, heating is less in regions where the grooves are relatively wide and present in large numbers than in areas where the grooves are very narrow and spaced very far apart from one another, since heating is most intense in the places where the foil lies flush against a flat heating plate. Particular zones of the foil can therefore be given different heat treatments through the agency of the network or raster on the heating plate. Such a control can also be provided by arranging the heating elements in or on the heating plate. For instance a heating plate in which the heating elements are disposed substantially centrally is a little cooler at the edge than in its central part so that near the edge of the heating plate the foil is heated less than elsewhere. Other arrangements of the heating elements have a corresponding effect and can be used to suit the requirements with regard to the article being shaped. Advantageously, zones of different temperature can be produced on the heating plate if said plate consists of heated and unheated parts. A similar effect can be achieved according to the invention if the heat transfer between the heating plate and the foil is inhibited in some zones by poorly thermally conductive supports or intermediate elements. For instance, the heating-plate zones of reduced heat transfer can be provided with a heat-resistant lacquer or layers of enamel or other layers which are poor heat conductors can be included in the heating plate.

It is known per se to provide different heating of different zones of the foil which it is required to shape, for the reason that if the foil is heated uniformly, excessive expansion occurs, more particularly in mould parts which project or are recessed considerably, so that the finished article has too little wall thickness, while an unnecessary amount of material remains in the parts which have not expanded so much. Very often, it is precisely the places of reduced wall thickness which subsequently have to withstand heavy stressing. By heating different parts of the foil to different extents, the foil material can be distributed in the required manner at the places thus treated.

Endeavours have been made for instance, in infra-red heating of the foil, to provide this differentiated heating by using shading provided by wire netting or the like, but it will be apparent from the foregoing that such shading can be provided, by the method and apparatus according to the present invention, much more accurately and simply than in the known method.

To produce the complicated base parts and cover parts or the like hereinbefore described, the apparatus according to the invention can with advantage comprise a hollow mould which is formed with a recess surrounding the mould part peripherally, one wall of such recess being formed by the mould part on to which is pressed one wall of the groove formed from the foil. Of course, this mould part and other mould parts need not be in one piece, and, as already stated, the mould part can be at the edge of a recipient, while the other mould parts are formed by the hollow mould of the actual apparatus. In this case the foil engages intimately and accurately with the annular hollow mould.

If the groove with which the foil is required to be formed is near that part of the apparatus by which the foil is retained i.e., by which the foil is clamped after the fashion of a diaphragm, there is no need to provide a closed annular hollow mould. Instead, an open slot can be left between the mould part against the centre-remote side of which the corresponding foil part is pressed, and the other parts of the mould, such slot then also serving for air venting. The advantage of this step is that it is easier to introduce a recipient edge into the mould. Another advantage is that the shaping step need not be carried so far that the foil engages intimately in the whole of the annular hollow mould and it is enough to carry the shaping step to the point at which the foil bears firmly against the moulding element, for instance, the recipient edge, bearing in mind that the foil, when pressed into the hollow mould, initially bulges out in the centre, such bulge being substantially bubble-shaped if no resistance is provided by a hollow mould. The foil then engages intimately with complicated moulding elements so that the foil always starts to be engaged or pressed against the parts near the mould centre, as seen from outside. The final pressing occurs at the foil edge—i.e., near those parts of the apparatus in which the foil has been clamped. Near the shaping edge, therefore, is an open slot which, if it were in the centre of the mould, might lead to the destruction of the foil.

The foil-retaining means can be so designed as to be downwardly movable relatively to the rest of the hollow mould, more particularly that side thereof which is remote from the centre of the mould and against which a part of the foil is pressed and the heating plate. That part of the foil which bears against the mould can therefore be pulled down, thus providing an increased bearing surface without any need to make the groove any deeper, for deepening of the groove would, of course, make the foil thinner, and an overlapping edge should, of course, usually have no such reduced parts. Conversely, if the foil-retaining part of the apparatus is shifted to an extreme position, the overlapping part of the foil can be thinned, a feature which has been found advantageous for press-in covers with an overlapping edge. If in this construction of the foil-retaining means, instead of a groove first being formed around the moulding elements the other parts of the foil are first finish-shaped, the outer part of the foil can subsequently be pulled over the moulding element by lowering the foil-retaining means, the moulding elements simultaneously being pressed against the outer part of the foil. The difference lies merely in the starting position of the foil-retaining means relatively to the moulding element.

The moulding elements prepared by the method according to the invention can be round or polygonal—i.e., they can have four or more sides, and the corners can, of course, be rounded. Of course, differently shaped articles can be produced in the manner specified.

For the rest, the method according to the invention requires only very little outlay of apparatus, for all that is required apart from the hollow mould or moulding elements which are necessary in any case is a heat source, formed in a simple way as a heating plate, and a negative pressure source and a compressed air source. The complete apparatus is therefore very reliable in operation and simple to handle and can be fitted as an attachment, for instance, in existing equipment, such as filling or closing machines, without difficulties.

Specific embodiments of the invention will now be described by way of example with reference to the accompanying drawings in which.

Figure 1:
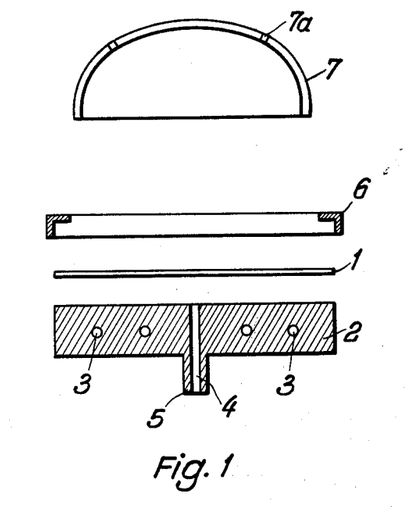
FIGURE 1 illustrates in section an apparatus in a first embodiment of the invention, showing the vacuum and compressed air supply in the heating plate.

FIGURE 1 illustrates a circular foil disc 1 and, disposed therebelow, a metal plate 2 of the same size comprising electric heating by means of heating elements 3, the plate 2 being formed with a central bore 4 which terminates in a tubular connection 5 connected to a compressed air source (not shown).

When the plate 2 is at the required temperature, the foil 1 is pressed firmly against its surface. To remove any bulges or buckles or creases, the foil can be pressed, for instance, by a brush or roller or the like, on to the heating plate so as everywhere to lie flush thereagainst. The foil is soon heated to the required temperature for shaping, a foil of a thickness, for instance, of 0.2 mm. being completely at heating plate temperature within a few tenths of a second. The foil 8 is then fixed, for instance, by pressing on an angle-piece ring, and compressed air is supplied through the central bore 4. The foil then bulges upwards cupola-fashion, and its expansion can be limited by a dome-shaped hollow mould 7 formed with vent apertures 7a. The foil cools rapidly in the mould 7 and can be removed as a rigid article after the ring 6 has been released.

If the tubular connection 5 is connected to a vacuum source as well as to a compressed air source, the foil disc can first be clamped to the plate 2 by the ring 6, whereafter the negative pressure operates against the underside of the foil. Any air still present between the foil and the heated surface is therefore removed satisfactorily without any mechanical pressure being applied to the foil, and the same, as it heats up, is applied by atmospheric pressure to the heated surface just as tightly, and without any creasing, as if it was pressed by mechanical means. The foil is then shaped by supplying compressed air through the bore 4, as hereinbefore described.

Figure 2:
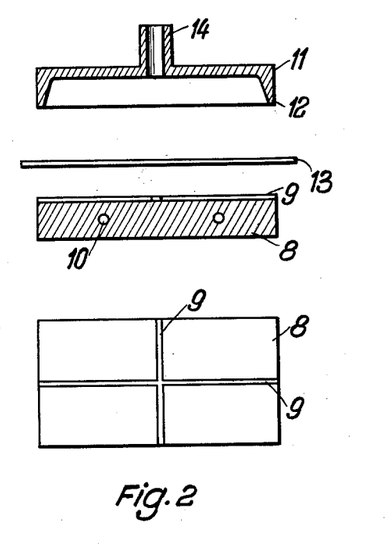
FIGURE 2 illustrates in section an apparatus in a second embodiment of the invention, with the compressed air and vacuum supply in the hollow mould.

In the embodiment shown in FIGURE 2 the heating plate 8 is formed on its surface with two narrow crossing grooves 9 which have a lateral connection to atmosphere and are formed similarly to the known lubricating grooves.

The mould comprises electric heating elements 10. The heating plate is shown in plan view in the bottom part of FIGURE 2. A hollow mould 11, shown at a distance from the foil in FIGURE 2, can be engaged tightly with the plate 8, a peripheral edge 12 of the mould then clamping a piece of foil 13 after the fashion of a diaphragm. Of course, the foil 13 must be at least as large as the plan of the mould 11, otherwise it cannot be engaged by the edges thereof. Of course, the piece 13 can be larger and form, for instance, a portion of a foil strip which can be provided here, for instance, continuously with cover embossings which can be dissolved out of the foil strip subsequently. The cover is formed with a bore having a port 14 connectible alternatively to sources of compressed air and negative pressure. When the hollow mould has been placed in position and compressed air is supplied through the port 14, the piece of foil 13 is pressed against the heating plate 8, and the air between said plate and the foil is pressed laterally outwards through the grooves 9. A changeover is then made from the compressed air source to the vacuum source so that the foil disengages from the plate 8 and presses against the inside of the hollow mould. Air is sucked through the grooves 9 into the hollow which then forms below the foil.

The mould 11 can then be removed from the heating plate 8, taking with it the foil article inside it due to suction so that such article has a chance of cooling and setting. The article can be ejected by compressed air.

Figures 3, 4:
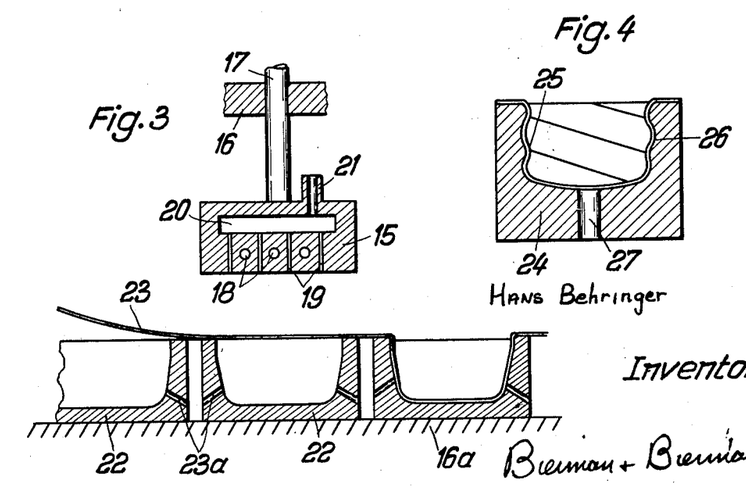
FIGURE 3 illustrates a third embodiment of the invention for shaping foil strips.
FIGURE 4 shows how an article which it is required to seal can be used as hollow mould.

In the embodiment shown in FIGURE 3 a heating plate 15 is provided which can be moved up and down on a plunger 17 guided in a machine frame 16. The plate 15 comprises heating elements 18 and a number of air flow apertures 19 extending to a chamber 20 connected to a pipe 21 connectible alternatively to a source of negative pressure or compressed air. Hollow moulds 22 formed with air vents or slots 23a and disposed on a table 16a of the machine frame are moved below the heating plate 15 from left to right in the drawing, to be moved onwards to the right in the drawing after the shaping step. A foil strip taken, for instance, from a reel (not shown) is introduced between the plate 15 and the hollow moulds 22.

In the state shown in the drawing, the piece of foil below the plate 15 has not yet been shaped. To shape it, the plate 15 is lowered by pressure being applied to the plunger 17 until the foil has been clamped after the fashion of a diaphragm between the edge of the mould 22 and the heating plate 15, whereafter the port 21 of the heating plate is connected to the source of negative pressure so that the foil engages flush with the plate 15, whereafter the foil is pressed into the hollow mould by compressed air admitted through the port 21. The finished foil article remains initially in the mould 22 and is conveyed onwards therewith towards the right-hand side of the drawings, so that the foil strip 23 is advanced by an amount corresponding to one portion and a new piece to be shaped moves below the hollow mould. The next hollow mould also moves up from the left so that a further shaping step can be performed immediately without having to wait for the article to cool completely in the hollow mould.

In the embodiment illustrated in FIGURE 4 a filling or greasing nipple 24 for a machine casing is used as hollow mould. The greasing nipple comprises a coarse internal screwthread 25 and has received a matching closure plug 26 made of plastic foil. The nipple 24 is moved below the plunger-like heating plate 15 in the position of the hollow mould 22 shown in FIGURE 3, whereafter the foil is pressed into such nipple as described with reference to FIGURE 3. This is readily possible since such a nipple is formed with an aperture 27 through which air can escape when the foil is pressed in. The plastic plug 26 is, of course, an exact fit in the screwthread 25. The plug 26 is separated from the strip of foil after the shaping at the periphery of the nipple, to give the article shown in FIGURE 4.

Figure 5:
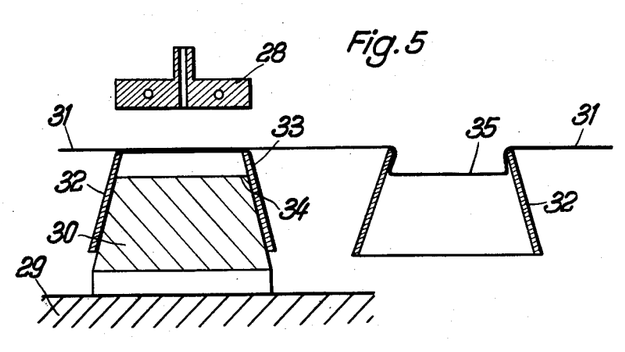
FIGURE 5 shows how base parts are introduced into cup-shaped articles.

In the embodiment shown in FIGURE 5 a heating plate 28 is provided which is simpler than the heating plate shown in FIGURE 3 but which operates similarly. Of course, a heating plate formed with a number of airflow apertures can be provided in this case too. Frustoconical shaping elements 30 are moved below the heating plate 28 on a table 29, and a foil strip 30 is guided between the elements 30 and the heating plate 28. Disposed on the elements 30 are, for instance, the rough blanks 32 of paper cups having the form of the generated surface of a cone which is open at top and bottom. The top edge 33 of the blanks co-operate with the top circular surface 34 of the element 30 to form a hollow mould into which the foil plasticised by the plate 28 can be accurately fitted by the compressed air acting on it. Visible on the right-hand side of FIGURE 5 is such a blank 32 already fitted with the plastic base and without the element 30 which, of course, can be removed after the shaping step. Clearly, the base fits intimately into the body of the paper cup so that, for instance, the now finished paper cups can be conveyed along in the foil strip until it is required to cut the base out of such strip.

It is known to provide the blanks or bodies of paper cups with an internal impregnation or layering to improve their water-tight properties. If a thermoplastic substance, such as a hot-sticking lacquer, is used for such layering, there is produced on the edge 33 just by virtue of this step alone a tight connection between the cup inside and the fitted foil base, since the foil is still hot when it adapts itself intimately to the edge 33. Once the cup base has been cut out of the foil strip, therefore, a finished cup is provided with a liquid-tight fitted base.

Of course, there is no need for the complete cup blank to be provided with the thermoplastic to ensure a sealing-tight fit of the base, and it is quite sufficient, if, for instance, the rest of the cup is sealed in a different way, for the edge 33 to have an appropriate coating. Of course, the foil can be given an appropriate covering although it is usually easier to apply the covering to the mould-forming part.

Of course, this step can be used not only to produce cup bases but to produce bases for any other kinds of recipient, and the method can be used to close recipients.

Figure 6:
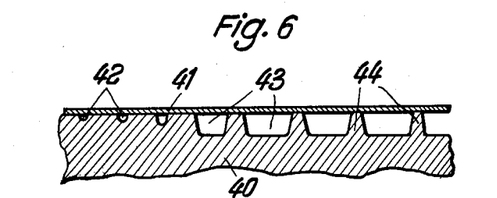
FIGURE 6 is a section through a heating plate formed with grooves and ducts at varying spacings and of varying widths.

FIGURE 6 is a considerably enlarged sectional view through the surface of a heating plate 40 with a foil 41 lying on it. The heating plate is formed with grooves or ducts of different widths and depths and at varying distances from one another. The fine grooves 42 are to remove any air between the foil and the plate surface when the foil is pressed on to the plate or is sucked on to the plate. The grooves 43 are deliberately widened and deepened so that the support surface for the foil 41 just takes the form of the remaining narrow webs 44. Consequently there is only a limited amount of direct heat transfer from the heating plate to the foil so that the foil material is heated less above the recesses and grooves than in the places where the foil material lies flush against the heated surface.

Figure 7:
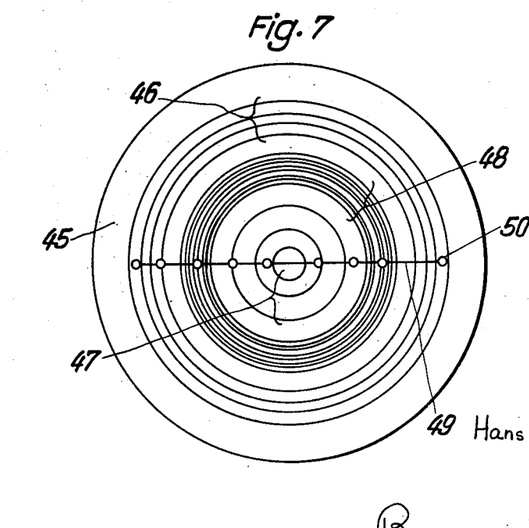
FIGURE 7 is a plan view of a heating plate formed with a network of grooves or ducts.

As can be seen in FIGURE 7 the grooves can be disposed in a circle on a round heating plate 45. The grooves 46, 47 are fine circular grooves corresponding approximately to the grooves 42 shown in FIGURE 6. The grooves 48 are widened and are separated from one another only by a reduced distance so that in the region of such separations the heating of the foil is reduced in the required manner. That part of the foil zone which is given the reduced heating corresponds to the part which will subsequently form the bottom base edge of the bottom part of a recipient. Such edge, in a uniformly heated foil, would be too thin and too delicate, since such an edge is in a position in the finished recipient where it is subjected to heavy stressing. However, if this foil zone is heated less than the remainder of the foil in the manner hereinbefore described, the resultant bottom part of the recipient has sufficient strength, for instance, on the edge of its base.

All the grooves are connected through a groove 49 to air-flow apertures 50. Of course, a number of corresponding radial grooves can be provided but reliable suction and raising of the foil can be provided by a single connecting groove. Of course, the grooves need not necessarily be in the form of concentric circles such as is, of course, usually the best arrangement for circular heating plates. The grooves can take the form of parallel straight lines extending over the heating surface. More particularly in the case of heating plates having a shape other than the circular, it is advisable for the grooves to be fitted in raster form as is known, for instance, from book-printing although care must then be taken to ensure that some of the raster grooves communicate with air-flow apertures.

Figure 8:
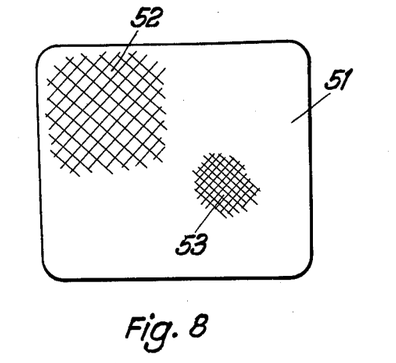
FIGURE 8 is a plan view of a heating plate, examples of a raster-like arrangement of grooves and ducts being shown.

FIGURE 8 is a plan view of a rectangular heating plate 51. Two examples 52, 53 of different raster sizes are shown on the surface of the plate 51; of course, the arrangement of these rasters is purely exemplary. The way in which the different rasters are disposed on the plate depends, of course, upon the article which it is required to produce.

The area 52 is divided by finely scored lines, after the fashion of a raster, into a number of surface elements which provide a good heat transfer by direct contact of the foil with support, but the heat transfer in the regions between the raster dots is less, but negligibly so if the lines are far apart from one another. The distance between the raster lines is less in the area 53, and the heat transferred per cm.$^2$ is also less than in the area 52. By varying the rastering and maintaining the plate temperature constant everywhere in the plate, a sort of temperature image can be produced on the foil, just as is done in screen printing where different brightness values can be produced on the paper by the same application of ink.

Another way of providing reduced heating of the foil is to apply to the heating plate, for instance, in the zone of the grooves 50 of the heating plate 45 shown in FIGURE 7, a heat-resistant lacquer or to apply a layer of enamel or asbestos or the like somewhere in this region in a recess.

Figure 9:
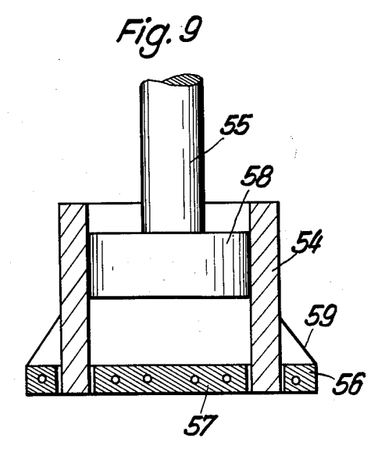
FIGURE 9 is a section through a heating plate comprising heated and unheated parts.

Alternatively, and as shown in FIGURE 9, the heating plate itself can be divided into zones. In the embodiment shown in FIGURE 9 the inner zone is formed by a disc 57 electrically heated to a desired temperature. Following the zone 57 in the outwards direction is an annular zone which is formed by the bottom edge of a thick-walled metal cylinder 54. By means of a plunger 55 and its thickened bottom piston 58, the cylinder 54 is given a good thermally conductive connection on a large bearing surface. The cylinder 54 is unheated. The heat penetrating thereinto is rapidly removed upwards by the metal parts. Further outwards, the heating plate comprises a narrow heated ring 56 secured at just a few parts of its periphery to the cylinder 54 by thin angle-pieces 59; if required, the inner disc 57 can be secured by similar strip-like ribs to the cylinder 54 and to the piston 58. Of course, the parts 54, 56 and 57, can if required, be interconnected by way of a layer which conducts heat very little, if at all.

A different temperature can be maintained in each zone of such a heating plate and the different temperatures would, of course, be accurately communicated to a foil pressed on to the plate.

Figure 10:
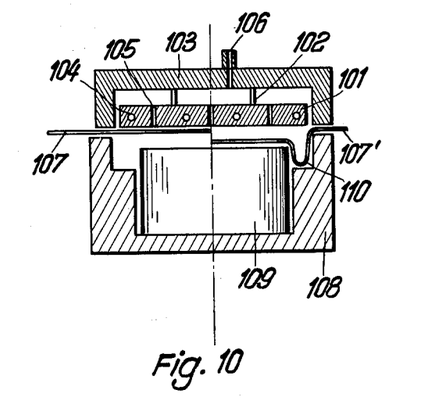
FIGURE 10 is a section through an apparatus in another embodiment of the invention, the left-hand half of the figure showing the initial position and the right-hand half of the figure showing the end position.

The apparatus illustrated in FIGURE 10 comprises a heating plate 101 which is not provided with a separate air chamber as has been hereinbefore described; instead, the heating plate 101 is so mounted in freely suspended manner in a dome 103 by means of pins 102 that an air space is left between the heating plate and the dome. The air space has communication downwards through the annular gap betweben the heating plate 101 and dome 103 and through bores 105 in the heating plate 101. Negative or positive pressure can be applied by way of a port 106 connected to the dome. The heating plate comprises heating elements 104.

A foil 107 is clamped after the fashion of a diaphragm between the bottom edge of the dome 103 and the top edge of the mould 108. The mould 108 is formed with an annular hollow receiving a cylindrical member 109, the head of which is to be covered around with the foil. In other words, the corresponding foil part is pressed against that side of the cylinder 9 which is remote from the centre of the mould.

To produce simple drop covers the mould 108 and element 109 can, of course, be made in one piece, in which case that part of the mould which corresponds to the cylindrical element 109 corresponds to the top part of a recipient underpart.

As has previously been disclosed the foil 107 is first sucked against the heating plate 101 and heated rapidly to the required temperature, whereafter compressed air is introduced into the air chamber to act upon the foil which is given the shape (107') shown on the right-hand side of FIGURE 10. The foil therefore forms a peripheral groove 110, the inner wall of which engages intimately with the head of the cylindrical element 109. After the shaping of the foil is completed, the underpart 108 is lowered and/or the dome 103 with the heating plate is raised so that the shaped foil 107' can be removed. If only that part of the shaped foil which bears flush with the element 109 is required, a circular cut is made around such part and the surplus foil parts are removed. Similar considerations apply when it is required to produce separate covers or the like which can then be removed from the mould either individually or in the strip of foil. In such a case the cover is cut out either in the mould or at some later time.

Figure 11:
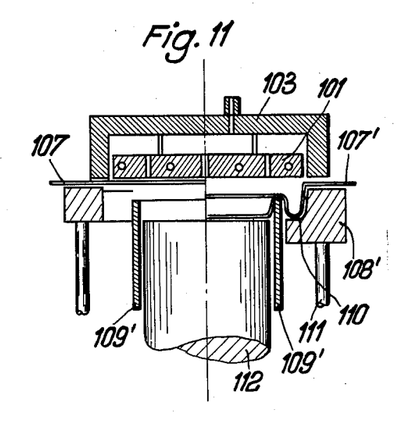
FIGURE 11 is a corresponding section through an apparatus in a further embodiment of the invention.

In the embodiment illustrated in FIGURE 11, the heating plate 101 and dome 103 are identical with the heating plate 101 and dome 103 shown in FIGURE 10, but the hollow mould 108 is reduced just to a ring 108' which is borne by a tubular member 111 and serves merely to clamp the foil 107.

The mould part near the mould centre is formed by a hollow cylinder 109' which can be, for instance, a piece of tube or a packaging-box blank, for instance, of cardboard. The cylinder 109' receives a rather shorter pin 112 which co-operates with the cylinder 109' to form the central part of the mould. The outer annular part is formed by an open slot between the ring 108' and the hollow cylinder 109'. This mould part, being near the clamped part of the foil, need not be closed, since in this edge zone the foil lies flush in the mould only towards the completion of the shaping step. Destruction of the foil in the edge zone can be obviated by using appropriate steps, for instance, interrupting shaping in good time or less heating of the foil in the edge zone, even though only an annular slot is provided in the edge zone.

For the rest, the ring 108' of this embodiment has a shape which corresponds to the foil when it expands freely in the mould, so that the foil bears against this part of the mould and is therefore relieved of load. Even where pressures are considerable, a gap, for instance, of 1 mm. between the ring 108' and the cylinder 109' is of no importance since the foil is not pressed in this gap. The gap facilitates the supply of new hollow cylinders 108' and their removal after foil shaping is completed. The width of the air gap depends upon the width of the cylinder edge to be shaped and upon the thickness of the foil used.

In the present case, very long hollow cylinders 109' can be used since the actual tool consists just of the ring 108' and all that is required is an extension of the tubular elements 111.

Shaping is performed as described with reference to FIGURE 10 except that in the embodiment illustrated in FIGURE 11 the foil 107' is laid completely around the top edge of the hollow cylinder and therefore surrounds said cylinder internally and externally. The foil adapts itself intimately to any irregularities of the edge, including any overlapping seam with which the cylinder may be provided. Press-in covers with an overlapping edge can therefore be produced in this way and such covers can be removed from the apparatus either individually or in the form of a cover strip. The covers then just have to be severed from the remainder of the foil near the apex of the groove 110 and fit very accurately a recipient underpart corresponding to the hollow cylinder 109'.

More particularly in the manufacture of recipient bases, but possibly for closing recipients as well, the procedure can be such as already stated, that the foil is shaped directly on the recipient blank which in this case forms the hollow cylinder 109'. A very tight closure is therefore provided very simply and in a single step.

To improve the sealing-tightness of this closure the top edge of the blank of the box can be provided on its cut—i.e. end—surface or on its inside or outside or everywhere with a thermoplastic adhesive, a cement or the like. Such adhesives and so on are included in the intimately engaging groove in the foil when the base is shaped in, so that they cannot be removed and provide reliable sealing tightness. Similar effects can be achieved when a recipient blank is closed which comprises on one side a covering of a thermoplastic for sealing purposes. When the heated foil is pressed against that part of the recipient blank which have been provided with such a covering, the engaging surfaces can be welded together immediately. Similar considerations apply to the case where recipient blanks of plastic foil are used. If required, the recipient blanks can be preheated in the areas concerned or prepared in some other known manner for relatively-low-temperature welding.

Figure 12:
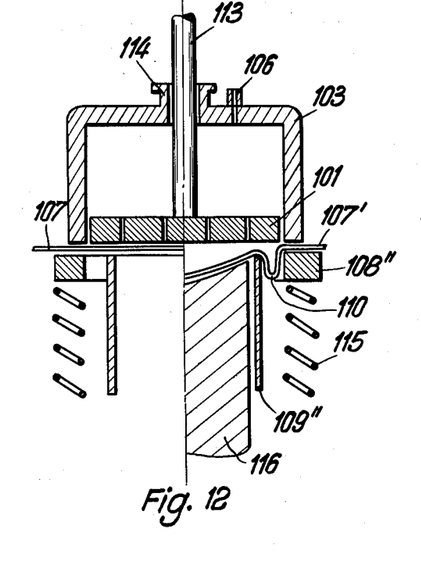
FIGURES 12 and 13 are sections through an apparatus in yet another embodiment of the invention, the left-hand half of FIGURE 12 showing the initial position, the right-hand half of FIGURE 12 showing an intermediate position, and FIGURE 13 showing the end position.

The apparatus illustrated in FIGURE 12 is similar to the apparatus shown in FIGURE 10 but differs therefrom in that the heating plate is not rigidly secured to the dome 103 but is secured to a rod 113 movably guided in the dome 103 with the interposition of a gland 114. The ring 108" is not secured to tubular elements 111 but rests upon spiral springs 115. Disposed in the hollow cylinder 109" is a pin 116, the surface of which is concave in the present case.

Figure 13:
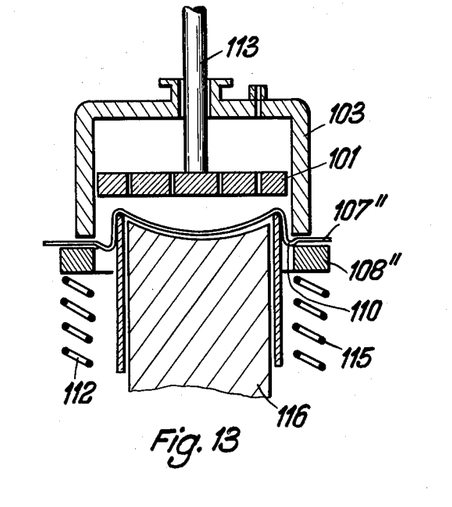

After the foil 107 has been clamped between the bottom edge of the dome and the ring 108", shaping is performed as described with reference to FIGURE 10, a peripheral groove 110 being formed in the foil 107", in the annular gap between the cylinder 109" and the ring 108". In this shaping step of the foil, the dome 103 can be pressed down against the force of the springs 115 as shown in FIGURE 13, so that the retained part of the foil is moved down relatively to the foil parts which have been shaped by the other parts of the mould. The foil material in the groove 110 is therefore lowered further, consequently an even wider zone of the cylinder 109" is surrounded downwardly with the foil than could be achieved, for instance, in the embodiments hereinbefore described. By this means, and as already stated, the overlapping edge of the cover can be drawn out to be thin, a feature which is often of advantage.

Upon the completion of shaping and after the foil has set, the dome 103 can be returned to its initial position, the ring 108" normally being raised as well by the springs 115. Alternatively, the ring can be retained in its bottom position by means (not shown) in order that the foil—i.e., the box plank closed thereby—may be removed from the mould.

Figure 14:
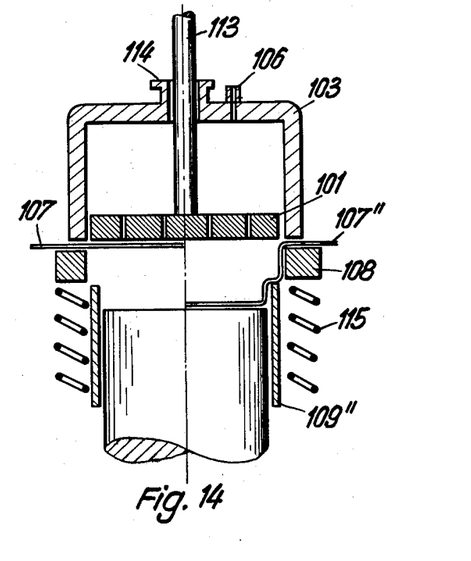
FIGURES 14 and 15 are each a sectional view through an apparatus in a further embodiment of the invention, the illustration being the same as in FIGURES 12 and 13.
Figure 15:
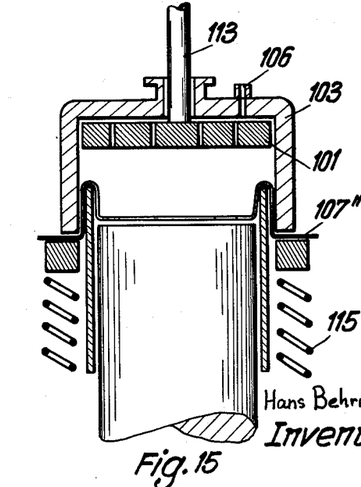

In the embodiment illustrated in FIGURES 14 and 15 the dome 12 and ring 108" are movable relatively to the heating plate 101 and the mould parts 109", 116, the movement being, of course, merely relative. The gap between the heating plate and the parts 109", 116 is initially so great that the mould part which will subsequently be pressed against the outer edge of the cylinder 109" is above the edge thereof. The foil is therefore initially pressed into the hollow mould being produced in this way and is engaged more particularly with the top wall of the part 116 and with the inner wall of the part 109". There is no danger of the foil being pressed against the ring 108" since, as already stated, the tendency to shape out the foil is initially very reduced near the clamping device, more particularly when, as in the present case, the foil has the chance of being shaped approximately in accordance with the bubble which is formed without resistance.

In the immediately following second phase of the case now being described, the ring 108" being secured to tubular elements 111", the parts 116, 109' and the heating plate 101 are raised so that the outer foil part is drawn over the edge of the hollow cylinder 109". By the use of further and possibly higher pressure such foil part is then pressed against the outer wall of the edge of the cylinder 109". Clearly, in this method the foil is used fully to cover the hollow cylinder 109' and there is less waste than is associated with the embodiment illustrated in FIGURES 10 and 11.

If the hollow cylinder 109" is a box blank, a hollow base is formed in the hollow part of the pin of the embodiments illustrated in FIGURES 11–15, otherwise a corresponding cover part is formed. The cover or base can be formed with the use of dies which provide the foil with numbers or letters or the like. If required, interchangeable dies can be used which can be fitted to the pin 112 or 116.

In all the embodiments illustrated in FIGURES 10 to 15 the shaping step is performed with compressed air supplied by a pressure chamber above the heating chamber. Of course, foil shaping can be performed by means of a vacuum as hereinbefore described. In such a case, the hollow mould of FIGURE 10 would have to comprise appropriate vacuum ducts. In the other figures the slot can serve the purpose of such ducts but the bottom part of the apparatus must then, of course, be sealed. In particular, in the latter case the foil can be heated in a manner other than that hereinbefore described, for instance, by infra-red radiation, so that the method and apparatus according to the invention are of use in association with such heating methods.

What I claim is:

1. A method of producing containers which comprises providing an open-ended container, placing the same on an internal mold so that said open end extends beyond the end of said internal mold, providing a foil of thermoplastic material contacting said foil with a heated plate pressing said foil onto said heated plate to cause it to bear flush against said heated plate and to eliminate air bubbles therebetween, thereby to first soften said foil, placing said foil over said open end, and then applying pneumatic pressure on said foil to cause it to enter said open end and adhere to the inner wall and end of said container and form a self-sustaining end wall closure for the container.

2. A method according to claim 1 characterized in that said plate transmits heat irregularly over the surface of said foil before the application of the pneumatic pressure to the foil.

3. A method according to claim 1 characterized in that there is provided a ring mold surrounding said container below the open end thereof and said foil is caused to adhere to the outer wall of said container by expanding between said container and said ring mold.

4. A method according to claim 3 characterized in that said container is of paper.

5. The method of applying an end closure to a cylindrical receptacle comprising, placing a sheet of plastic material over the open end of a receptacle to be closed, applying a heated plate against the plastic sheet to soften the same while holding the sheet against the open end of the receptacle, pressing said foil onto said heated plate to cause it to bear flush against said heated plate and to eliminate air bubbles therebetween, and then applying air pressure to the sheet in a manner to cause the sheet to be forced down into the open end of the receptacle to form a closing wall therefor and to cause a marginal portion of the sheet to be forced into intimate contact with the inner wall surfaces of the receptacle to thereby hold the end closure thus produced firmly attached at the end of the receptacle.

6. The method as provided for in claim 5, wherein the plastic sheet is applied over the open end of a receptacle having a gradually-reduced diameter from one end to its other end and the sheet applied over the open end of smallest diameter, whereby the plastic sheet when forced into contact with the inner wall surfaces of the receptacle will be forced against tapering portions inside of the receptacle thus being locked in place in the end of the receptacle.

7. A method of closing an end of a container which comprises providing a container having an open end, placing a foil of thermoplastic material in proximity to the open end of said container, applying a heated plate against said foil, said plate having ducts for air flow therethrough from the exterior to said foil, pressing said foil onto said heated plate to cause it to bear flush against said heated plate and to eliminate air bubbles therebetween, then applying air pressure onto the hot foil through said ducts to force said foil into contact with the walls of said container and to seal said open end.

8. A method according to claim 7 characterized in that said pressing is by vacuum applied through said ducts.

9. A method according to claim 7 characterized in that the time of heating is less than a second.

References Cited in the file of this patent

UNITED STATES PATENTS

| | | |
|---|---|---|
| 892,702 | Wyman | July 7, 1908 |
| 1,876,931 | Heywood et al. | Sept. 13, 1932 |
| 2,210,509 | Strauch | Aug. 6, 1940 |
| 2,328,798 | Gardner | Sept. 7, 1943 |
| 2,531,539 | Smith | Nov. 28, 1950 |
| 2,702,411 | Winstead | Feb. 22, 1955 |
| 2,878,524 | Pink | Mar. 24, 1959 |
| 2,926,385 | Willson | Mar. 1, 1960 |
| 3,019,488 | Doyle et al. | Feb. 6, 1962 |

FOREIGN PATENTS

| | | |
|---|---|---|
| 575,802 | Canada | May 12, 1959 |
| 741,040 | Great Britain | Nov. 23, 1955 |
| 784,503 | Great Britain | Oct. 9, 1957 |
| 200,129 | Australia | Nov. 2, 1955 |